United States Patent [19]
Tsuchiya et al.

[11] Patent Number: 5,369,349
[45] Date of Patent: Nov. 29, 1994

[54] ELECTRIC MOTOR CONTROL SYSTEM

[75] Inventors: Yoshikazu Tsuchiya; Osamu Tsurumiya; Makoto Murata; Masataka Izawa; Yukihiro Fujiwara, all of Tochigi, Japan

[73] Assignee: Honda Giken Kogyo Kabushiki Kaisha, Tokyo, Japan

[21] Appl. No.: 845,229

[22] Filed: Mar. 3, 1992

[30] Foreign Application Priority Data

Apr. 26, 1991 [JP] Japan .................. 3-125290

[51] Int. Cl.$^5$ .................................... H02P 5/28
[52] U.S. Cl. .................... 318/811; 388/811;
388/903; 361/23; 180/79.1
[58] Field of Search ............. 180/79.1; 318/434, 139,
318/445, 798–808, 810–812; 388/907.2, 907.5,
811, 903; 361/23, 18, 30–31, 89–92, 83, 478

[56] References Cited

U.S. PATENT DOCUMENTS

| | | | |
|---|---|---|---|
| 4,532,567 | 7/1985 | Koda | 318/434 X |
| 4,611,682 | 8/1986 | Yasuda et al. | 361/24 X |
| 4,945,298 | 7/1990 | Nakashima | 318/635 |
| 4,972,133 | 11/1990 | Hirota et al. | 318/646 |
| 5,081,404 | 1/1992 | Kelley et al. | 318/434 |

Primary Examiner—William M. Shoop, Jr.
Assistant Examiner—David Marty
Attorney, Agent, or Firm—Irving M. Weiner; Joseph P. Carrier; Pamela S. Burt

[57] ABSTRACT

An electric motor control system has a motor driver comprising a bridge of switching elements, a pair of failure detectors, and a microcomputer. The motor driver is connected between a battery and an electric motor that is connected between the switching elements. The switching elements are turned on and off according to drive pulse signals supplied from the microcomputer for supplying a pulsed current to the electric motor. The failure detectors monitor the electric energy supplied to the electric motor to detect a period of time in which the supplied electric energy is free of pulses, and supply a signal indicative of the detected period of time to the microcomputer. Based on the signal from the failure detectors, the microcomputer detects a failure when the detected period of time exceeds a predetermined period of time.

12 Claims, 6 Drawing Sheets

ELECTRIC MOTOR CONTROL SYSTEM

BACKGROUND OF THE INVENTION

1. Field of the Invention

The present invention relates to an electric motor control system for use in an electrically operated steering apparatus for automobiles, and more particularly to an electric motor control system for controlling an electric motor with a chopper.

2. Description of the Relevant Art

Electrically operated steering apparatus for automobiles include an electric motor disposed in a system which transmits steering forces to road wheels for producing a torque output to steer the road wheels or assist in steering the road wheels. The electrically operated steering apparatus also include an electric motor control system for controlling energization and de-energization of the electric motor.

Such electric motor control systems are disclosed in Japanese laid-open patent publications Nos. 64-9064 and 2-274667, for example. The disclosed electric motor control systems comprise a motor driver circuit in the form of a bridge of switching elements such as FETs, and a microcomputer connected to the motor driver circuit. The motor driver circuit is connected between the positive and negative terminals of a battery mounted on the automobile, and the electric motor has terminals connected between the terminals of the switching elements of the motor driver circuit.

The electrically operated steering apparatus incorporating the above electric motor control systems operate as follows: The microcomputer calculates a duty factor as a target value or a set point depending on the speed of travel of the automobile, and outputs drive signals (PWM signals) that have been pulse-width-modulated with the duty factor, to the motor driver circuit. In the motor driver circuit, the switching elements are turned on and off according to the duty factor of the PWM signals, thereby supplying a pulsed current to the electric motor.

The electrically operated steering apparatus diagnose the battery, the motor driver circuit, the electric motor, and other components for a failure. In the event of a failure being detected, the electric motor is de-energized in fail-safe operation. In the failure diagnosis, the current supplied to the electric motor is detected by a current sensor, and an output signal from the current sensor is processed by the microcomputer. If the detected current represented by the output signal from the current sensor differs from a value corresponding to the set point duty factor, then the microcomputer determines the condition as a failure.

The current sensor detects the current supplied to the electric motor as an averaged or smoothed value. Therefore, the current sensor is not able to detect some partial eliminations of the current supplied to the electric motor, i.e., removal of a few pulses of the current supplied to the electric motor, due to wearing of the brushes of the electric motor. For this reason, the conventional electric motor control systems fail to carry out an accurate failure diagnosis.

The conventional electric motor control systems detect a failure when the difference between the actual current detected by the current sensor and the set point current value exceeds a predetermined reference value. Since the general current sensors have relatively low detecting accuracies and the different motor driver circuits have different resistances, the reference value has to be set high enough to take account of such deficiencies. The high reference value also results in a failure diagnosis inaccuracy.

SUMMARY OF THE INVENTION

It is an object of the present invention to provide an electric motor control system which is capable of effecting an accurate failure diagnosis.

According to the present invention, there is provided an electric motor control system having motor driving means comprising a bridge of switching elements connected to an electric power supply, for supplying a pulsed current to an electric motor connected between the switching elements by turning on and off the switching elements based on drive pulse signals applied to the motor driving means, wherein the improvement comprises electric energy supply monitoring means for monitoring electric energy supplied to the electric motor to detect a period of time in which the electric energy supplied to the electric motor is free of pulses, and failure determining means for determining a failure when the period of time detected by the electric energy supply monitoring means exceeds a predetermined period of time.

The failure determining means determines a failure when a current supplied to or a voltage applied to the electric motor is continuously free of any pulses over the predetermined period of time. The electric motor control system can detect a periodic failure due to wear of one of the brushes of the electric motor, as well as failures of the switching elements when they remain continuously turned on or off. The electric motor control system can therefore accurately diagnose the motor driving means, the electric motor, etc. for a failure.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
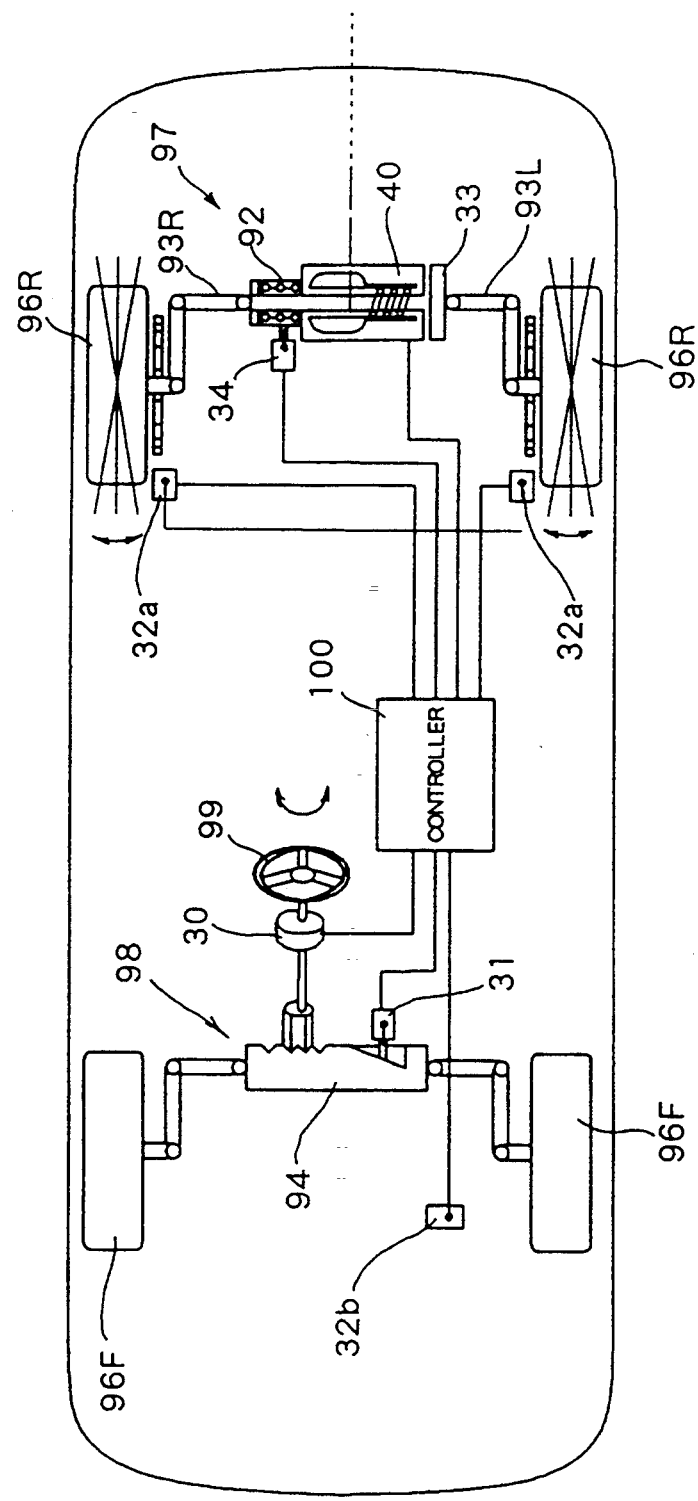
FIG. 1 is a schematic plan view of front and rear wheel steering apparatus for an automobile, which incorporates an electric motor control system according to the present invention.

As shown in FIG. 1, an automobile includes a steering wheel 99, a front wheel steering apparatus 98 for steering front road wheels 96F, and a rear wheel steering apparatus 97 for steering rear road wheels 96R, the steering wheel 99 being operatively coupled to the front wheel steering apparatus 98.

The front wheel steering apparatus 98 has a steering gear mechanism 94 such as a rack-and-pinion mechanism or the like by which the steering wheel 99 and the front road wheels 96F are mechanically operatively connected to each other. The front wheel steering apparatus 98 is of a known structure.

The front wheel steering apparatus 98 may comprise a power steering apparatus combined with an actuator for assisting in steering action.

The steering wheel 99 is associated with a main front wheel steering angle sensor 30 for detecting the angle through which the steering wheel 99 is turned, i.e., the angle through which the front road wheels 96F are steered. The front wheel steering apparatus 98 includes an auxiliary front wheel steering angle sensor 31 mounted on the steering gear mechanism 94 for detecting the steering angle of the front road wheels 96F. The main front wheel steering angle sensor 30 comprises a digital sensor such as an encoder or the like for generating a digital pulse signal composed of a predetermined number of pulses per unit steering angle. The auxiliary front wheel steering angle sensor 31 comprises an analog sensor such as a differential transformer for producing an analog signal representing a potential corresponding to the front wheel steering angle. The front wheel steering angle sensors 30, 31 are electrically connected to apply detected signals to a controller 100.

The rear wheel steering apparatus 97 has an electric motor 40 as an actuator for steering the rear road wheels 96R. The electric motor 40 has an output shaft operatively coupled to the rear road wheels 96R through respective transmitting mechanisms 93L, 93R each including a ball screw mechanism and a link mechanism. The electric motor 40 is electrically connected to the controller 100, and can be energized thereby to steer the rear road wheels 96R. The rear wheel steering apparatus 98 includes a spring 92 for normally urging the rear road wheels 96R into a neutral steering position.

The rear wheel steering apparatus 97 is associated with a main rear wheel steering angle sensor 33 and an auxiliary rear wheel steering sensor 34, both for detecting the angle through which the rear road wheels 96R are steered. The main rear wheel steering angle sensor 33 comprises a digital sensor such as an encoder or the like for generating a digital pulse signal composed of a predetermined number of pulses per unit steering angle. The auxiliary front wheel steering angle sensor 34 comprises an analog sensor such as a differential transformer for producing an analog signal representing a potential corresponding to the rear wheel steering angle. The rear wheel steering angle sensors 33, 34 are electrically connected to apply detected signals to the controller 100.

Vehicle speed sensors 32a detect the speed of rotation of the rear road wheels 96R. A vehicle speed sensor 32b detects the speed of rotation of an output shaft of a transmission (not shown) on the automobile. These vehicle speed sensors 32a, 32b are also electrically connected to apply detected signals to the controller 100. If necessary, the vehicle speed sensors 32a, 32b will collectively be referred to as a vehicle speed sensor 32.

Figure 2:
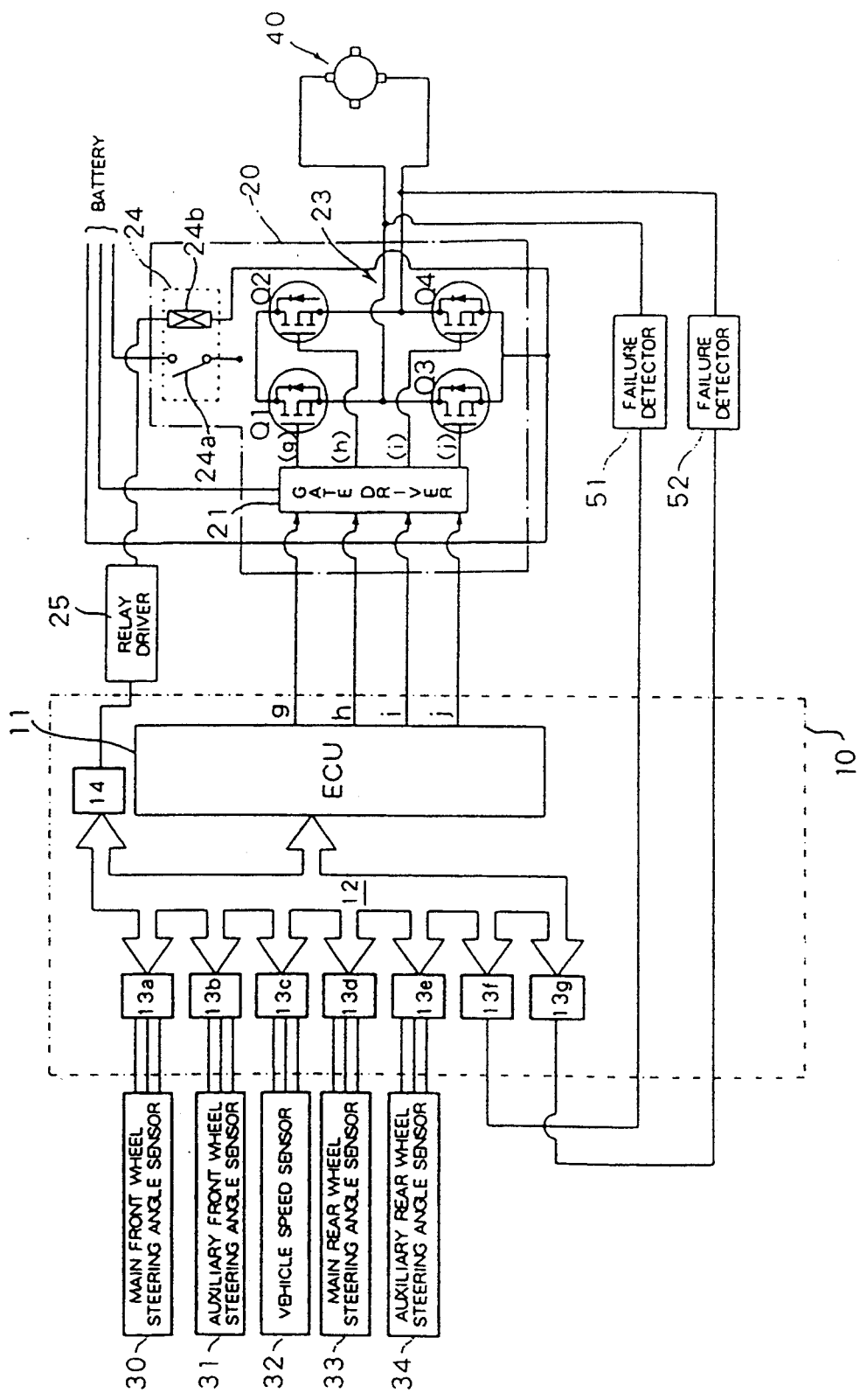
FIG. 2 is a block diagram of a control system of the front and rear wheel steering apparatus shown in FIG. 1.

As shown in FIG. 2, the controller 100 has a control circuit 10 and a driver circuit 20. The control circuit 10 has a microcomputer or ECU 11, seven input interfaces 13a~13g, and an output interface 14, which are connected to each other by a data bus 12. The main front wheel steering angle sensor 30 is electrically connected to the input interface 13a. The auxiliary front wheel steering angle sensor 31 is electrically connected to the input interface 13b. The vehicle speed sensor 32 is electrically connected to the input interface 13c. The main rear wheel steering angle sensor 33 is electrically connected to the input interface 13d. The auxiliary rear wheel steering angle sensor 34 is electrically connected to the input interface 13e. Failure detectors 51, 52 are electrically connected to the input interfaces 13f, 13g, respectively. The output interface 14 is electrically connected to a relay driver 25 for a cutout relay 24.

The microcomputer 11 has a CPU, ROM, RAM, etc., and is electrically connected to a gate driver 21 of the driver circuit 20. The microcomputer 11 processes input signals applied thereto from the input interfaces 13a~13g, determines a duty factor as a set point for a current to energize the electric motor 40, and outputs PWM signals g, h, i, j to the gate driver 21. The microcomputer 11 also effects a failure diagnosis based on signals from the failure detectors 51, 52, and in the event of a failure, the microcomputer 11 outputs a shutoff signal to the relay driver 25. As described later on, the microcomputer 11 calculates a target or set point steering angle for the rear road wheels 96R, and determines the duty factor depending on the difference between the target steering angle and the actual steering angle of the rear road wheels 96R. The microcomputer 11 detects a failure when the failure detectors 51, 52 output a low-level signal L.

The driver circuit 20 comprises the gate driver 21, a motor driving circuit 23, and the cutout relay 24. The gate driver 21 is electrically connected to a battery (not shown). The motor driving circuit 23 is electrically connected to the battery through the cutout relay 24. The gate driver 21 is supplied with the PWM signals g, h, i, j, and outputs drive signals (g), (h), (i), (j) corresponding respectively to the supplied PWM signals g, h, i, j to the motor driving circuit 23. The drive signals (g), (h), (i), (j) have a frequency such as 20 kHz and a duty factor which are the same as those of the PWM signals g, h, i, j.

The cutout relay 24 comprises a normally open contactor 24a and a solenoid 24b. The contactor 24a is electrically connected between the motor driving circuit 23 and the battery, and the solenoid 24b is electrically connected to the relay driver 25. The relay driver 25, which is electrically connected to the output interface 14, energizes the solenoid 24b to close the contactor 24a under normal conditions. In the event of a failure as detected by the microcomputer 11, the microcomputer 11 applies a shutoff signal through the output interface 14 to the relay driver 25, and the relay driver 25 de-energizes the solenoid 24b, thus opening the contactor 24a.

The motor driving circuit 23 comprises a bridge of four FETs (Field-Effect Transistors) Q1, Q2, Q3, Q4 as switching elements. The FETs Q1~Q4 have respective gates electrically connected to the gate driver 21. The FETs Q1~Q4 are turned on and off according to the duty factors of the drive signals (g), (h), (i), (j) which are supplied from the gate driver 21 and applied to the gates of the FETs Q1~Q4. As described above, these drive signals (g), (h), (i), (j) correspond respectively to the PWM signals g, h, i, j.

The FETs Q1, Q2 have respective drains connected to the battery through the cutout relay 24. The FETs Q3, Q4 have respective sources connected to ground (i.e., the negative terminal of the battery). The source of the FET Q1 and the drain of the FET Q3 are connected to each other, and the source of the FET Q2 and the drain of the FET Q4 are connected to each other. The electric motor 40 is connected between the junction between the source of the FET Q1 and the drain of the FET Q3 and the junction between the source of the FET Q2 and the drain of the FET Q4. The failure detectors 51, 52 are connected respectively to the junction between the source of the FET Q1 and the drain of the FET Q3 and the junction between the source of the FET Q2 and the drain of the FET Q4.

The electric motor 40 has a rotor composed of windings and a stator composed of magnets. The windings of the rotor are electrically connected to the motor driving circuit 23 through a brush. When the FETs Q1~Q4 are turned on and off, the electric motor 40 is supplied with a pulsed current from the moor driving circuit 23, and the voltage E (see FIG. 6(a)) applied across the electric motor 40 varies with time as rectangular pulses. The current supplied to the electric motor 40 and the voltage E applied across the electric motor 40 have a frequency and a duty factor which are equal to those of the drive signals (g), (h), (i), (j). As described above, the electric motor 40 is incorporated in the rear wheel steering mechanism 98 for steering the rear road wheels 96R.

Figure 3:
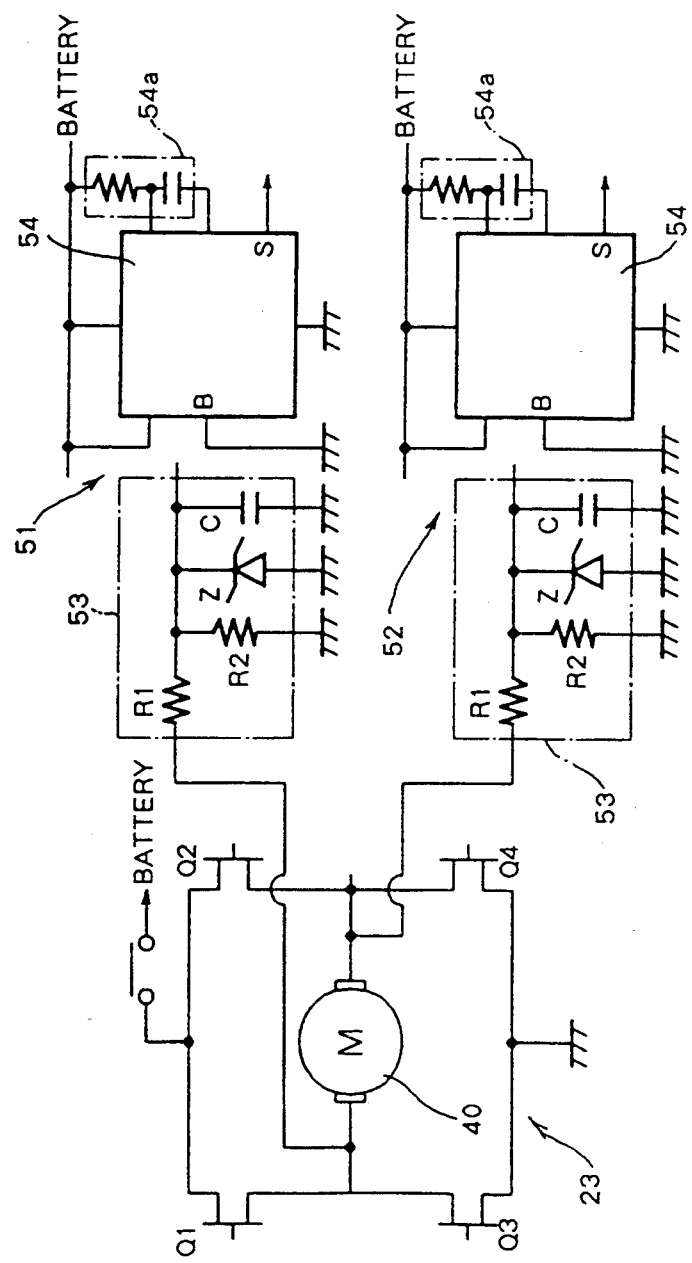
FIG. 3 is a circuit diagram, partly in block form, of a portion of the electric motor control system.

As shown in FIG. 3, each of the failure detectors 51, 52 comprises an integrator 53 and a monostable multivibrator 54. The monostable multivibrator 54 has an input terminal B connected through the integrator 53 to the source-to-drain junctions between the FETs Q1~Q4. The failure detectors 51, 52 are identical in structure, and their identical parts are denoted by identical reference characters.

The integrator 53 of each failure detector has a resistor R1 connected in series between the motor driving circuit 23 and the monostable multivibrator 54. The junction between the resistor R1 and the monostable multivibrator 54 is grounded by a resistor R2, a capacitor C, and a zener diode Z which are connected parallel to each other. The integrator 53 integrates the pulsed voltage E applied to the electric motor 40, and generates a trigger pulse in synchronism with a positive-going edge of the voltage E.

The monostable multivibrator 54 is of the retriggerable type having a time-constant circuit 54a for determining a pulse duration and an output terminal S connected to the input interface 13f, 13g. When a trigger pulse is applied from the integrator 53 to an input terminal B of the monostable multivibrator 54, the monostable multivibrator 54 outputs a rectangular pulse signal (see FIG. 6(b)) having a predetermined pulse duration τ. When a trigger pulse is applied to the monostable multivibrator 54 while it is producing the rectangular pulse signal, the monostable multivibrator 54 outputs a continuous high-level signal H (see FIG. 6(a)).

The time-constant circuit 54a is arranged such that the pulse duration τ of the rectangular pulse signal outputted by the monostable multivibrator 54 is several times larger than the period of the current supplied to the electric motor 40, e.g., the pulse duration τ is 5 ms when the current supplied to the electric motor 40 has a frequency of 20 kHz. The pulse duration τ is also selected such that it does not exceed the time required for the electric motor 40 to make one revolution at its maximum speed and also does not exceed the time whose value is produced by dividing the above time for the electric motor 40 to make one revolution at its maximum speed, by the number of brushes of the electric motor 40.

The microcomputer 11 serves as a failure determining means for determining a failure. The motor driving circuit 23 serves as a motor driving means, the cutout relay 24 as a switch means, the failure detectors 51, 52 as an electric energy supply monitoring means, the integrator 53 as a pulse generating means, and the monostable multivibrator means 54 as a time determining means.

Figure 4:
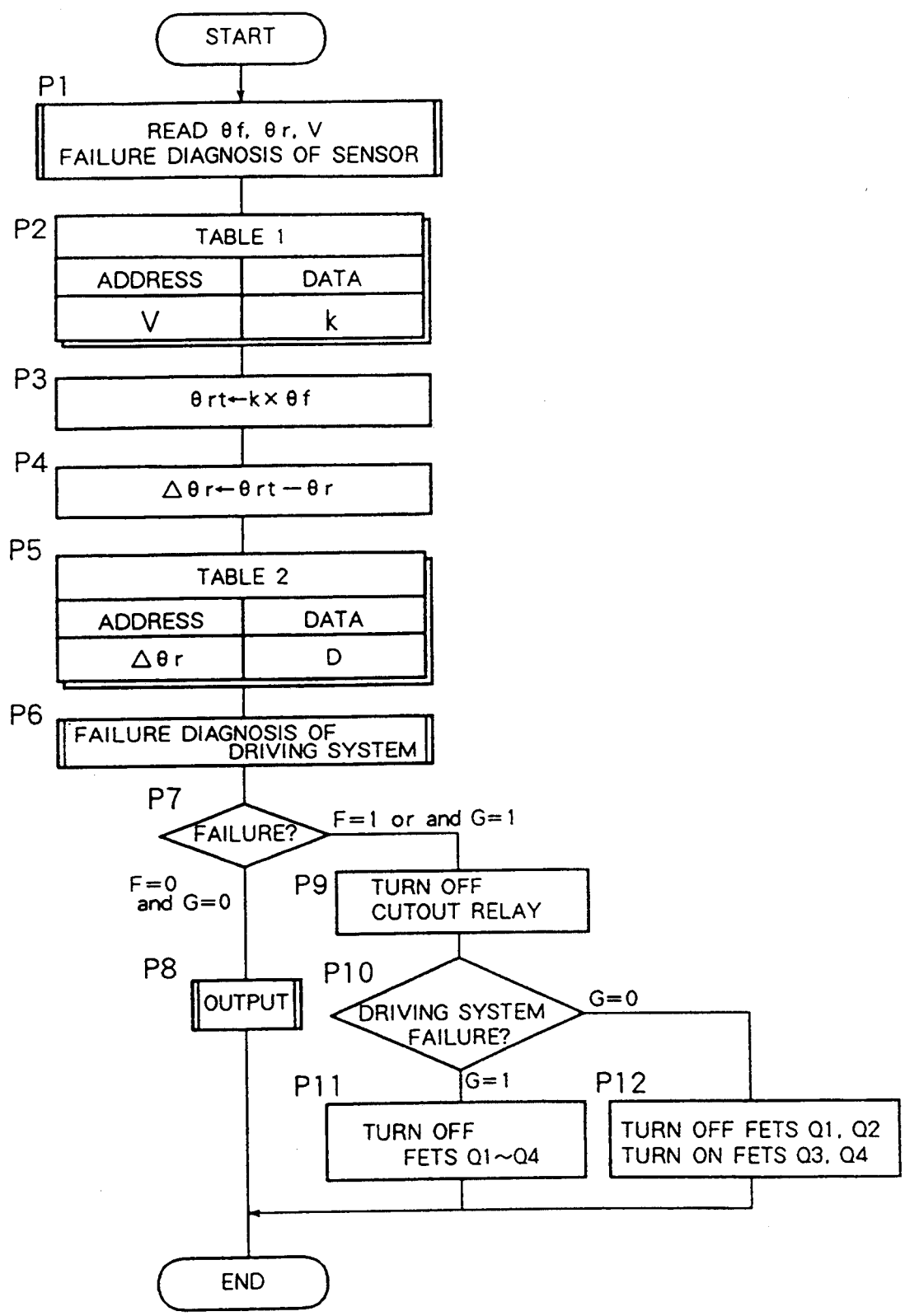
FIG. 4 is a flowchart of a main routine of controlling operation of the electric motor control system.

The microcomputer 11 repeatedly effects a control process as shown in FIG. 4 for energizing the electric motor 40 to control the steering angle of the rear road wheels 96R.

In a step P1 shown in FIG. 4, the microcomputer 11 reads an actual front wheel steering angle θf, an actual rear wheel steering angle θr, and a vehicle speed V from the output signals from the sensors 30, 31, 32, 33, 34, and also diagnoses these sensors 30, 31, 32, 33, 34 for a failure according to a subroutine (not shown). If the micro-computer 11 finds these sensors faulty in the step P1, it sets a failure flag F to 1, and will carry out a process described below.

Then, the microcomputer 11 searches a data table 1 for a steering angle ratio k using the vehicle speed V as an address in a step P2. As described in the publications referred to above, the data table 1 contains negative steering angle ratios k in a lower vehicle speed range and positive steering angle ratios k in a higher vehicle speed range. The microcomputer 11 multiplies the actual front wheel steering angle θf by the steering angle ratio k, producing a target rear wheel steering angle θrt in a step P3, and calculates a difference or error Δθr between the target rear wheel steering angle θrt and the actual rear wheel steering angle θr in a step P4.

In a next step P5, the microcomputer 11 searches a data table 2 for a duty factor D using the error Δθr as an address. The data table 2 contains duty factors D which are zero in a range of smaller errors Δθr, of a constant value in a range of larger errors Δθr, and linearly increase between the smaller and larger error ranges.

Then, the microcomputer 11 diagnoses a driving system, which includes the motor driving circuit 23, the electric motor 40, the wires connected to the battery, etc., for a failure according to a subroutine (described later on) in a step P6. When the driving system is determined as having a failure in the step P6, the microcomputer 11 sets a failure flag G to 1. The failure flags F, G are 0 under normal conditions, and are initially set to 0.

In a step P7, the microcomputer 11 checks the failure flags F, G, i.e., determines whether the sensors and the driving system are suffering a failure or not. If the failure flags F, G are 0, i.e., if the sensors and the driving system are normal, then control goes from the step P7 to a step P8. If at least one of the failure flags F, G is 1, i.e., if at least the sensors or the driving system is suffering a failure, then control goes to a step P9.

In the step P8, the microcomputer 11 sets one of the duty factors of the PWM signals g, h to 1 and one of the duty factors of the PWM signals i, j to D depending on whether the error Δθr is positive or negative, i.e., depending on the direction in which the rear road wheels 96R are steered. Therefore, under normal conditions, one of the FETs Q1, Q2 is turned on, and one of the FETs Q3, Q4 is turned on and off according to the duty factor D, supplying a rectangular pulse current (see FIG. 6(a)) to the electric motor 40.

In the step P9, the microcomputer 11 outputs a shutoff signal to the relay driver 25 to de-energize the solenoid 24b of the cutout relay 24. In the event of a failure, therefore, the contactor 24a is opened, disconnecting the motor driving circuit 23 and hence the electric motor 40 from the battery. The step P9 is followed by a step P10 which determines whether the driving system is suffering a failure or not, i.e., whether the failure flag G is 1 or 0. If the failure flag G is 1, control goes to a step P11, and if the failure flag G is 0, then control goes to a step P12.

In the step P11, the microcomputer 11 sets the duty factors of all the PWM signals g, h, i, k to 0. Therefore, in the event of a failure of the driving system, all the FETs Q1~Q4 of the motor driving circuit 23 are turned off.

In the step P12, the microcomputer 11 sets the duty factors of the PWM signals g, h to 0, and the duty factors of the PWM signals i, j to 1. Therefore, in the event of a failure of the sensors, the FETs Q1, Q2 are turned off, and the FETs Q3, Q4 are turned on, short-circuiting the terminals of the electric motor 40. The electric motor 40 now operates in a dynamic braking mode, reliably preventing the steering angle of the rear road wheels 96R from varying.

Figure 5:
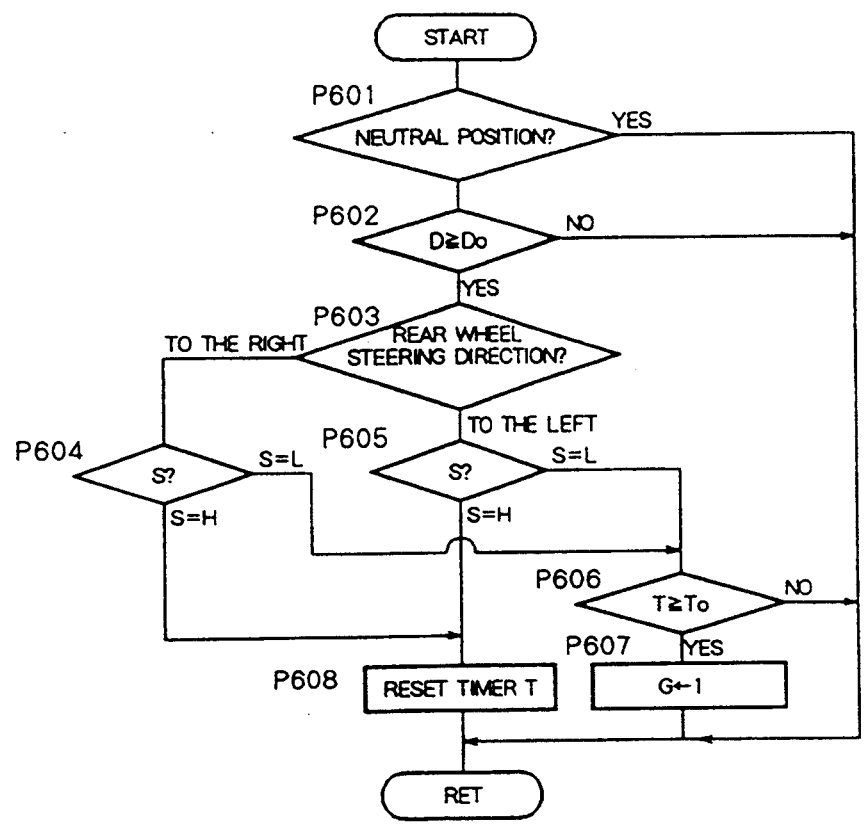
FIG. 5 is a flowchart of a subroutine of controlling operation of the electric motor control system.

The subroutine for the failure diagnosis of the driving system in the step P6 is shown in FIG. 5. First, the microcomputer 11 determines whether the actual front wheel steering angle θf is zero or not, i.e., whether the front road wheels 96F are in a neutral steering position or not, in a step P601. If the front road wheels 96F are in the neutral steering position in the step P601, then control jumps to the step P7 of the main routine (FIG. 4). If the front road wheels 96F are not in the neutral steering position in the step P601, then control goes to a step P602.

The step P602 determines whether or not the duty factor D determined in the step P5 is of a predetermined value Do or greater. If the duty factor D is smaller than Do, then control returns to the step P7 (FIG. 4). If the duty factor D is Do or higher, then control goes to a step P603. The step P602 is effective to avoid an erroneous diagnosis as smaller pulse durations of the PWM signals are ignored.

In the step P603, the microcomputer 11 determines the steering direction of the rear road wheels 96F based on the sign (positive or negative) of the error Δθr. If the rear road wheels 96R are turned to the right, then control goes to a step P604, and if the rear road wheels 96R are turned to the left, then control goes to a step P605. In the step P604, the microcomputer 11 determines the value of the output signal S from the monostable multivibrator 54 of the failure detector 51. In the step P605, the microcomputer 11 determines the value of the output signal S from the monostable multivibrator 54 of the failure detector 52. If the output signal S from the monostable multivibrator 54 is low (L) in level, then control goes from the steps P604, P605 to a step P606. If the output signal S from the monostable multivibrator 54 is high (H) in level, then control goes from the steps P604, P605 to a step P608.

Figure 6:
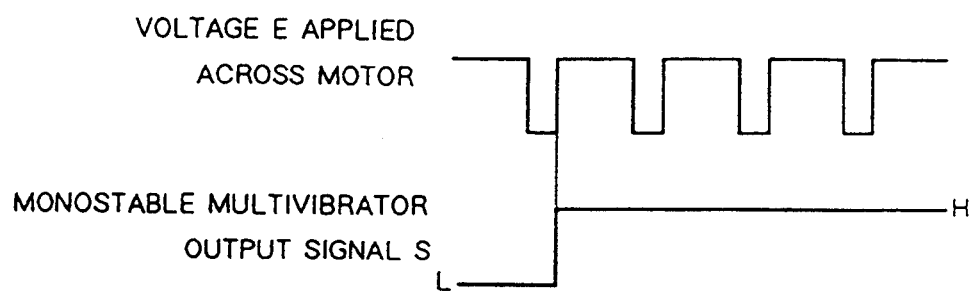
FIG. 6(a) is a timing chart illustrative of operation of the electric motor control system under normal conditions.
FIG. 6(b) is a timing chart illustrative of operation of the electric motor control system in the event of a failure.
Figure 6:
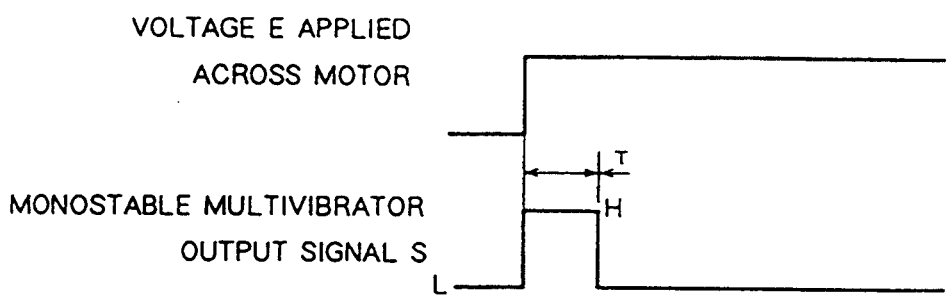

As shown in FIG. 6(a), the output signals S from the failure detectors 51, 52 are continuously high (H) in level when the voltage E applied across the electric motor 40 is in the form of successive rectangular pulses under normal conditions. If the driving system suffers a failure and the voltage E applied across the electric motor 40 does not vary but remains constant, the output signals S go low (L) as shown in FIG. 6(b). For example, if the FETs of the motor driving circuit 23 fail and remain continuously turned on, then the voltage E remains continuously high in level, and the monostable multivibrators 54 produce only one pulse in response to a positive-going edge of the voltage E, after which the output signals S go and remain low (L). If the FETs fail and remain continuously turned off, with the voltage E resulting in a continuous zero level, or if one of the brushes of the electric motor 40 is worn out, with the voltage E resulting in a zero level during one revolution of the electric motor 40, then the output signals S of the monostable multivibrators 54 go and remain low (L). Accordingly, the microcomputer 11 can determine a continuously-turned-on failure of the FETs, a continuously-turned-off failure of the FETS, a periodic failure caused by wear of one of the brushes of the electric motor 40, and a breakage of the wires connected to the battery and the electric motor 40.

In the step P606, the microcomputer 11 determines whether or not the time T measured by a timer T is a predetermined time To or longer. If the time T is shorter than To, then control returns to the main routine. If the time T is equal to or longer than To, then the microcomputer 11 sets the failure flag G to 1 in a step P607. In the step P608, the microcomputer 11 resets the timer T.

In this embodiment, as described above, a failure is detected when the voltage applied to the electric motor 40 remains higher or lower than a predetermined value over a predetermined period of time. Therefore, a periodic failure that occurs in a short period of time upon rotation of the electric motor 40 can accurately be detected.

In the above embodiment, each of the failure detectors 51, 52 comprises a monostable multivibrator 54. However, each failure detector may employ a flip-flop instead of the monostable multivibrator and a watchdog timer for monitoring the waveform of the voltage E. Alternatively, the output signal of the flip-flop may be converted by an integrator into a voltage to be monitored.

A failure may be determined based on the current supplied to the electric motor 40 rather than the voltage applied across the electric motor 40.

While the present invention has been described as being applied to an electric motor control system for controlling an electric motor for steering rear road wheels, the principles of the present invention are also applicable to an electric motor control system for an electric motor of an electrically operated power steering apparatus.

As described above, the electric motor control system according to the present invention detects a failure when the period of time in which a voltage applied to or a current supplied to an electric motor is continuously of a constant value that remains unchanged, i.e., it does not contain any pulses, exceeds a predetermined period of time. Therefore, the electric control circuit can determine, accurately in a short time, a periodic failure caused by wear of one of the brushes of the electric motor, as well as a continuously-turned-on failure and a continuously-turned-off failure of the motor driving circuit.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. An electric motor control system having motor driving means comprising a bridge of switching elements connected to an electric power supply, for supplying a pulsed current to an electric motor connected between the switching elements by turning on and off the switching elements based on drive pulse signals applied to the motor driving means, wherein the improvement comprising:

electric energy supply monitoring means for monitoring electric energy supplied to the electric motor to detect a period of time in which the electric energy supplied to the electric motor is free of pulses; and failure determining means for determining a failure when the period of time detected by said electric energy supply monitoring means exceeds a predetermined period of time.

2. An electric motor control system according to claim 1, wherein said electric energy supply monitoring means comprises means for monitoring the current supplied to the electric motor.

3. An electric motor control system according to claim 1, wherein said electric energy supply monitoring means comprises means for monitoring a voltage applied to to the electric motor.

4. An electric motor control system according to claim 1, wherein said electric energy supply monitoring means is connected to all terminals of the electric motor which are connected to the motor driving means.

5. An electric motor control system according to claim 1, further including switch means for disconnecting the electric motor from the electric power supply when said failure determining means determines a failure.

6. An electric motor control system in an electrically operated steering apparatus of an automobile having a steering apparatus, comprising:

assistive steering control means for outputting pulse-width-modulated drive signals of duty factors depending on a steering action on the automobile;

a battery;

an electric motor for producing and applying a assistive steering force to the steering apparatus of the automobile;

motor driving means, connected between said electric motor and said battery and having a bridge of switching elements, for supplying a pulsed current to said electric motor by turning on and off said switching elements based on the duty factors of said pulse-width-modulated drive signals from said assistive steering control means;

electric energy supply monitoring means for monitoring electric energy supplied to said electric motor to detect a period of time in which the electric energy supplied to said electric motor is free of pulses; and failure determining means for determining a failure when the period of time detected by said electric energy supply monitoring means exceeds a predetermined period of time.

7. An electric motor control system according to claim 6, wherein the automobile has front and rear road wheels and a steering wheel mechanically disconnected from the rear road wheels, and the electrically operated steering apparatus comprises front and rear wheel steering apparatus for steering the rear road wheels together with the front road wheels, said front and rear wheel steering apparatus having said electric motor as an actuator for steering said rear road wheels.

8. An electric motor control system according to claim 6, wherein said electric energy supply monitoring means comprises means for monitoring the current supplied to the electric motor.

9. An electric motor control system according to claim 6, wherein said electric energy supply monitoring means comprises means for monitoring a voltage applied to to the electric motor.

10. An electric motor control system comprising:

an electric motor;

an electric power supply;

motor driving means having a bridge of switching elements connected between said electric motor and said electric power supply, for supplying a pulsed current to said electric motor by turning on and off said switching elements based on duty factors of pulse-width-modulated drive signals supplied to said motor driving means;

electric energy supply monitoring means, connected between said motor driving means and said electric motor, for monitoring electric energy supplied to said electric motor to detect a period of time in which the electric energy supplied to said electric motor is free of pulses; and failure determining means for determining a failure when the period of time detected by said electric energy supply monitoring means exceeds a predetermined period of time.

11. An electric motor control system according to claim 10, wherein said electric energy supply monitoring means comprises:

pulse generating means for outputting a pulse in synchronism with a positive-going edge of a voltage applied to said electric motor; and time determining means for outputting a determining signal, to be applied to said failure determining means, when no pulse signal is inputted from said pulse generating means beyond a predetermined period of time.

12. An electric motor control system according to claim 11, wherein said time determining means comprises a retriggerable monostable multivibrator for outputting a determining signal of a predetermined pulse duration in response to a single pulse inputted from said pulse generating means, said pulse duration being selected not to exceed a value produced by dividing a time required for said electric motor to make one revolution at a maximum speed thereof, by the number of brushes of said electric motor.

* * * * *

UNITED STATES PATENT AND TRADEMARK OFFICE
CERTIFICATE OF CORRECTION

PATENT NO. : 5,369,349
DATED : November 29, 1994
INVENTOR(S) : Tsuchiya et al.

It is certified that error appears in the above-indentified patent and that said Letters Patent is hereby corrected as shown below:

Column 5, line 10, delete "the" (first occurrence).

Column 9, line 31 (claim 3, line 4), delete "to" (first occurrence);
Column 9, line 49 (claim 6, line 8), change "a" to --an--.

Column 10, line 21 (claim 9, line 4), delete "to" (first occurrence).

Signed and Sealed this

Sixth Day of June, 1995

*Attest:*

BRUCE LEHMAN

*Attesting Officer*    *Commissioner of Patents and Trademarks*